US012562406B2

(12) United States Patent
Klee et al.

(10) Patent No.: US 12,562,406 B2
(45) Date of Patent: Feb. 24, 2026

(54) HAND-HELD POWER TOOL AND RECHARGEABLE BATTERY PACK FOR A HAND-HELD POWER TOOL

(71) Applicant: Robert Bosch GmbH, Stuttgart (DE)

(72) Inventors: Christoph Klee, Stuttgart (DE); Holger Wernerus, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 779 days.

(21) Appl. No.: 17/792,372

(22) PCT Filed: Jan. 21, 2021

(86) PCT No.: PCT/EP2021/051315
§ 371 (c)(1),
(2) Date: Jul. 12, 2022

(87) PCT Pub. No.: WO2021/151773
PCT Pub. Date: Aug. 5, 2021

(65) Prior Publication Data
US 2023/0047547 A1 Feb. 16, 2023

(30) Foreign Application Priority Data
Jan. 30, 2020 (DE) ..................... 10 2020 201 116.8

(51) Int. Cl.
*H01M 10/42* (2006.01)
*B25F 5/02* (2006.01)
(Continued)

(52) U.S. Cl.
CPC ..... *H01M 10/4264* (2013.01); *H01M 50/247* (2021.01); *H01M 50/296* (2021.01);
(Continued)

(58) Field of Classification Search
CPC ............. H01M 10/42; H01M 10/4264; H01M 50/247; H01M 50/296
See application file for complete search history.

(56) References Cited

U.S. PATENT DOCUMENTS

| | | | |
|---|---|---|---|
| 5,184,059 | A | 2/1993 | Patino et al. |
| 2009/0167246 | A1 | 7/2009 | Shen et al. |

(Continued)

FOREIGN PATENT DOCUMENTS

| | | |
|---|---|---|
| CN | 202059362 U | 11/2011 |
| CN | 104539216 A | 4/2015 |

(Continued)

OTHER PUBLICATIONS

International Search Report corresponding to International Patent Application No. PCT/EP2021/051315; mailed May 4, 2021 (7 pages).

*Primary Examiner* — Karie O'Neill Apicella
(74) *Attorney, Agent, or Firm* — Maginot, Moore & Beck LLP

(57) ABSTRACT

The disclosure relates to a rechargeable battery pack for a hand-held power tool, having an interface for establishing an electrical connection of the rechargeable battery pack to a hand-held power tool and/or a charging device. The interface has contact elements for electrically contacting corresponding mating contact elements on the hand-held power tool and/or on the charging device. One contact element is a signal contact element which is electrically connected to an encoder element of the rechargeable battery pack. A rechargeable battery pack electronics is configured to provide information relating to the rechargeable battery pack via the signal contact element, said information relating to the rechargeable battery pack being stored, at least in part, in the at least one encoder element, wherein in the recharge- (Continued)

able battery pack electronics, the encoder element is connected, in an electric parallel circuit, in parallel with a dynamic current path.

15 Claims, 6 Drawing Sheets

(51) Int. Cl.
| | |
|---|---|
| *H01M 50/247* | (2021.01) |
| *H01M 50/296* | (2021.01) |
| *H02J 7/00* | (2006.01) |

(52) U.S. Cl.
CPC .............. *H02J 7/0042* (2013.01); *B25F 5/02* (2013.01); *H01M 2220/30* (2013.01)

(56) References Cited

U.S. PATENT DOCUMENTS

2012/0169271 A1    7/2012    Dvorkin et al.

2013/0255980 A1    10/2013    Linehan et al.
2014/0266057 A1    9/2014    Woods
2017/0353041 A1 *  12/2017    Klee ......................... B25F 5/02
2018/0321324 A1    11/2018    Karippumannil Prasad et al.

FOREIGN PATENT DOCUMENTS

| CN | 104638313 A | 5/2015 | |
|---|---|---|---|
| CN | 107465220 A | 12/2017 | |
| DE | 10 2016 209 822 A1 | 12/2017 | |
| DE | 10 2018 206 885 A1 | 11/2019 | |
| EP | 1637897 A2 * | 3/2006 | ......... G01R 31/3665 |
| EP | 2 897 250 A1 | 7/2015 | |
| JP | H6-333604 A | 12/1994 | |
| JP | 2000-32677 A | 1/2000 | |
| JP | 2012-55043 A | 3/2012 | |
| JP | 2014-91176 A | 5/2014 | |
| KR | 10-1707150 B1 | 2/2017 | |
| TW | 200928403 A | 7/2009 | |

* cited by examiner

Fig. 4c
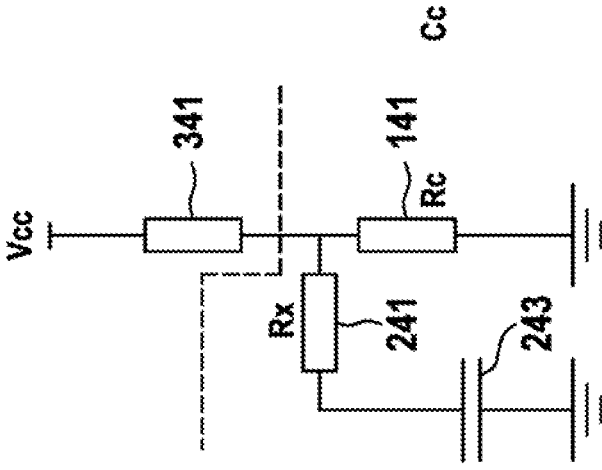
Fig. 4b
Fig. 4a
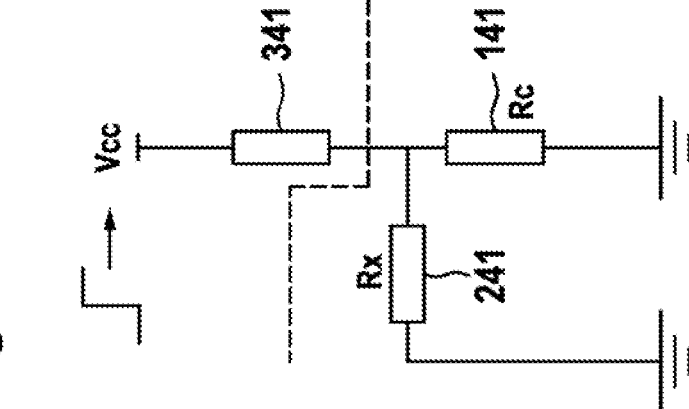

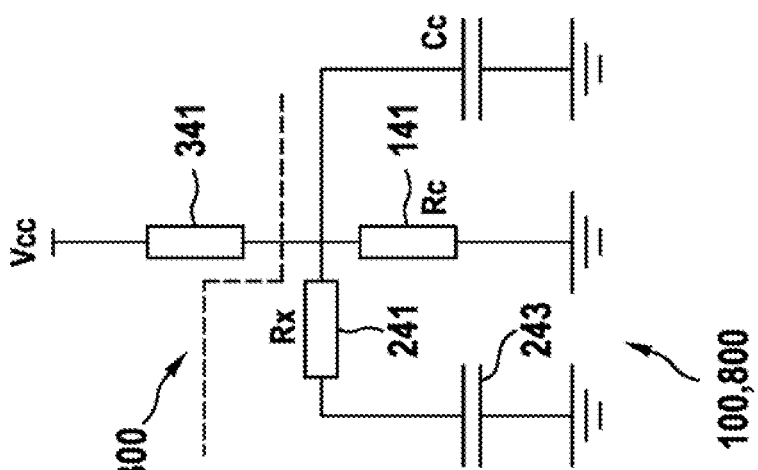
Fig. 5c
Fig. 5b
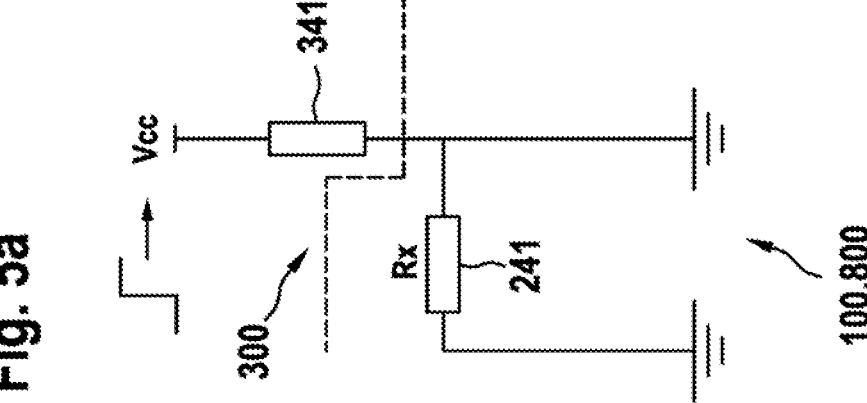
Fig. 5a

HAND-HELD POWER TOOL AND RECHARGEABLE BATTERY PACK FOR A HAND-HELD POWER TOOL

This application is a 35 U.S.C. § 371 National Stage Application of PCT/EP2021/051315, filed on Jan. 21, 2021, which claims the benefit of priority to Serial No. DE 10 2020 201 116.8, filed on Jan. 30, 2020 in Germany, the disclosures of which are incorporated herein by reference in their entirety.

SUMMARY

The present disclosure relates to a battery pack for a hand-held power tool as claimed in claim 1, to a hand-held power tool as claimed in claim 13, and to a charger as claimed in claim 15.

Electric hand-held power tools are known in principle and are supplied with electric power via a mains connection. Alternatively, battery devices allow a high degree of flexibility in working, since in particular they are non-dependent on mains power. In this way, for example, outdoor work can also be performed in a convenient manner, such that in many cases use of a battery pack is envisaged for operation of a hand-held power tool.

Such battery packs are known in principle and usually have a plurality of rechargeable storage batteries connected in parallel and/or in series, for example three cylindrical lithium-ion cells, each of for example 3.6 V, connected in series, with a total voltage of 10.8 V. The battery cells must be connected, on the one hand, to battery-pack electronics and to each other. The connected battery cells must be connected to battery-pack electronics, as well as to each other. The battery pack usually comprises a battery-pack housing in which the battery cells are preferably received, either completely or in part, by means of a cell holder. Alternatively, the cell holder itself forms a battery-pack housing element of the battery-pack housing.

In the context of this application, a battery pack is thus to be understood as a storage-battery packet, preferably composed of a plurality of electrically interconnected battery cells, which can store electrical energy, supplies the energy required for the operation of a hand-held power tool, and can be exchangeably mounted in a chamber, an interface or the like of the hand-held power tool. In particular, an interface is to be understood as a device designed to establish an electrical and, if necessary, a mechanical connection to a charger and/or a discharging side, i.e. the hand-held power tool, directly or indirectly.

The battery pack is coupled to the hand-held power tool by inserting, or sliding, the interface of the battery pack into a complementary socket or interface of the tool housing. The interface has contact slots, in which contact elements may be located. Once the energy of the battery pack is depleted, the battery pack can be removed and connected to a charging station that has corresponding mating contact elements. If there is more than one battery pack available, it is possible to remove the discharged battery pack from the hand-held power tool and exchange it for a charged one. In this case, the nominal voltage and capacity of the respective battery pack used usually determine the performance and runtime of the hand-held power tool. It is therefore important that the tool and charger have information about the battery pack, for example the maximum charging and discharging current, as well as the present operating temperature and the internal resistance of the battery pack.

It is known from the prior art that different hand-held power tools of one voltage class have battery packs that are not compatible with each other, whereas the battery packs of different hand-held power tools within one voltage class, for example a hand-held screwdriver, a cordless drill, an impact drill, a jigsaw, a multifunctional tool and/or a drill screwdriver, are often compatible.

It is also known that battery packs can identify themselves to the charger and the hand-held power tool by means of coding, such that other battery packs that are not designed for the hand-held power tool, e.g. those with a different nominal voltage, are not accepted by the hand-held power tool, so that there is no damage to the battery pack and/or the hand-held power tool. In other cases, the transmission of information serves to optimize the combined operation of the battery pack and the hand-held power tool, or charger.

In the prior art this is achieved, for example, by signal contact elements located in the interface of the battery pack, via which information specific to the battery pack can be transmitted to corresponding contact elements of the hand-held power tool and/or of the charger. In some cases, an exchange of information between battery pack and hand-held power tool and/or charger is also possible, i.e. information can be transmitted in both directions.

In the prior art, the signal contact elements are usually connected on the battery-pack side to coding elements, for example coding resistors. Typically, located in the corresponding mating contact elements of the hand-held power tool and/or the of charger, there is a pull-up resistor, via which the coding resistor on the battery-pack side is supplied with voltage. A measuring circuit in the hand-held power tool, or in the charger, then ascertains the resistance connected to the signal contact element, which is interpreted by a corresponding control system of the hand-held power tool, or charger, as information specific to the battery pack.

In the battery-pack electronics, a capacitor or a diode, for example, is often connected in parallel with the coding resistor, as protection against electrostatic discharge (ESD).

In this regard, it proves to be generally disadvantageous that only a limited amount of information can be transmitted by a coding element according to the method of coding elements described above, since both the battery packs and the hand-held power tools and chargers, and thus the respective interfaces, are subject to constant further development, which often makes it necessary to implement additional contact elements and mating contact elements in the interfaces in order to exchange additional information between the devices. For reasons of handiness and manageability of both the battery pack and the hand-held power tool, however, it is desirable to keep the installation space required for the interface as compact as possible. Moreover, for reasons of compatibility with predecessor models, there may be a requirement to change the geometry of the interface as little as possible with respect to a predecessor model.

It is an object of the disclosure to alleviate the above-mentioned disadvantages and to provide an improved battery pack, of the type mentioned at the outset, that can be used with a multiplicity of different hand-held power tools, with as much information as possible being able to be transmitted via a battery pack interface that is as compact as possible, with full compatibility with older-series hand-held power tools. At the same time, neither the recognition of the correct coding element nor any digital communication via the same lead is to be restricted.

It is a further object of the disclosure to specify a corresponding hand-held power tool and a corresponding charger that can read as much information as possible from the battery pack while being fully compatible with conventional battery packs.

These objects are achieved by a battery pack according to claim 1, and by a hand-held power tool according to claim 13, and a charger according to claim 15. Advantageous designs, variants and further developments of the invention disclosure are given by the dependent claims.

A battery pack according to the invention disclosure for a hand-held power tool has at least one interface for establishing an electrical connection of the battery pack to a hand-held power tool and/or a charger, wherein the interface has contact elements for electrically contacting corresponding mating contact elements on the hand-held power tool and/or corresponding mating contact elements on the charger, wherein at least one contact element is a signal contact element that is electrically connected to at least one coding element of the battery pack; battery-pack electronics, wherein the battery-pack electronics are designed to provide information relating to the battery pack via the at least one signal contact element, wherein the information relating to the battery pack is stored, at least in part, in the at least one coding element; and wherein, in the battery-pack electronics, the at least one coding element is connected, in an electrical parallel circuit, in parallel with a dynamic current path.

In the context of the application, a dynamic current path is understood to be a current path that can be altered as a function of time, i.e. is variable, in respect of particular electrical properties, in particular in respect of a voltage applied to the current path and/or an amperage flowing through the current path. In the context of this application, this characteristic of the dynamic current path is also referred to as time response.

Persons skilled in the art will recognize that this dynamic, or this time response, of a current path connected in parallel with the coding element offers the possibility of coding, in addition to the coding resistor, at least one further 1-bit item of information via the signal contact element and transmitting it to the hand-held power tool and/or the charger, thereby rendering superfluous the arrangement of a further signal contact element for transmitting this additional information. This is possible because a control system of the hand-held power tool, or of the charger, recognizes the dynamic and interprets it accordingly.

Advantageously, this time response is tuned in an electrically advantageous manner such that the dynamic required for digital communication between the battery pack and the hand-held power tool, or charger, is altered at most in a non-significant way. Specifically, it is ensured that necessary switching thresholds are not significantly affected in respect of time. It is thereby ensured that there is no functional impairment whatsoever, but at the same time at least one further item of information can be transmitted in analog form via the coding interface.

In one embodiment, the battery-pack electronics are configured to forward a supply voltage to the at least one coding element via a series resistor in a hand-held power tool or in a charger, the dynamic current path being configured to influence a time characteristic of a measurement voltage across the coding element. In this embodiment, the presence of the described time response is measured, for example, via a microcontroller on the hand-held power tool side or the charger side, by measurement of a voltage characteristic at the coding element during and after the charging process of the circuit. This can be use to code any 1-bit items of information. For increased depth of information, for example the characteristics of the described time response may be evaluated.

Advantageously, the dynamic current path is configured to influence the time characteristic of the measurement voltage across the at least one coding element only within a defined period of time after the supply voltage from the corresponding hand-held power tool and/or the corresponding charger is applied, wherein the defined period of time is preferably between 0 ms and 10 ms, particularly preferably between 0 ms and 1 ms. In this way, it can be achieved in the specific case that the time response is tuned in an electrically advantageous manner, such that it has already attained a final value during the static recognition of the coding element, for example in such a way that a final value of a voltage difference generated by the dynamic current path at the signal contact element is approximately zero volts. In other words, once the time response is complete, the voltage at the coding element corresponds to the voltage that would be present even without a dynamic current path connected in parallel with the coding element.

Preferably, in the battery-pack electronics, the signal contact element and the dynamic current path are connected in an electrical parallel circuit between a common ground terminal and the signal contact element.

In a preferred embodiment, the time dynamic is achieved in that the dynamic current path comprises at least one first capacitor and one first resistor connected in series. The first capacitor and the first resistor in this case may be arranged in an R-C series circuit or in a C-R series circuit in a manner known per se to persons skilled in the art. The dynamic of the dynamic current path is generated in this case by the fact that the first capacitor charges within a defined time when a DC supply voltage is applied, for example across a pull-up resistor located in the interface of the hand-held power tool or of the charger, and during charging, in a manner known per se, reduces the voltage applied to the first resistor until the current is equal to zero when the first capacitor is fully charged. The voltage applied to the first resistor is then likewise equal to zero.

In a specific embodiment, a capacitance Cx of the at least one first capacitor and a resistance value Rx of the at least one first resistor are selected in such a manner that a time constant $\tau=Rx*Cx$ of the first capacitor has a value of $\tau<10$ ms, preferably $\tau<1$ ms.

In one embodiment of the disclosure, the dynamic current path comprises two or more first capacitors connected in a parallel and/or series connection and/or two or more first resistors connected in a parallel and/or series circuit.

In a further embodiment, the dynamic current path, for a battery pack or battery pack type, has a defined capacitance value Cx and/or a defined resistance value Rx that, when a supply voltage (Vcc) from a hand-held power tool or charger is applied to the signal contact element, generate/generates a defined time response in the measurement voltage across the coding element, wherein this time response is distinguishable from the time response of other battery packs or battery pack types that, for example, have no dynamic current path or a dynamic current path of a different type.

In this way, theoretically any number of different capacitance values Cx and/or resistance values Rx can be distinguished in the time characteristic, for example in order to achieve 8-bit coding.

In a further embodiment, the battery-pack electronics comprise two or more dynamic current paths, wherein each of the two or more dynamic current paths are interconnected in an electrical parallel circuit in parallel with the at least one coding element, and wherein each of the two or more dynamic current paths has at least one first resistor having a resistance value Rx, i and at least one first capacitor having a capacitance Cx, i connected in series, wherein any combination of the two or more dynamic current paths within battery packs to be distinguished generates a distinguishable time response at the interface with the hand tool and/or the charger. As in the embodiment discussed above, basically any number of bits can be coded in this way.

In general terms, in one embodiment it is provided that the battery-pack electronics comprise two or more dynamic current paths, wherein each of the two or more dynamic current paths is interconnected in an electrical parallel circuit in parallel with the at least one coding element, and wherein each of the two or more dynamic current paths is constructed, in respect of its electrical components and its interconnection, in a manner similar to the first dynamic current path.

In one embodiment of the disclosure, there is a protective capacitor or a protective diode connected in an electrical parallel circuit in parallel with the at least one coding element. This makes it possible to protect the circuit against electrostatic discharge.

Preferably, the at least one coding element is a coding resistor, particularly preferably an ohmic resistor. In this embodiment, the ohmic resistance value of the ohmic resistor may be used as a coding value of the at least one first coding element.

According to a further aspect, the present disclosure comprises a hand-held power tool, comprising a battery pack as described above, an interface for electrically coupling the battery pack to the hand-held power tool, comprising at least one signal mating-contact element corresponding to the signal contact element of the battery pack; and a control unit, wherein the control unit is designed to receive information relating to the battery pack via the at least one signal mating-contact element; wherein the control unit is designed to sense and evaluate a time characteristic of a measurement voltage applied to the at least one signal mating-contact element.

The present disclosure also comprises a charger for charging a battery pack described above, the charger comprising an interface for electrically coupling the charger to the battery pack, comprising at least one charging mating-contact element corresponding to the signal contact element of the battery pack; and a control unit, wherein the control unit is designed to receive information relating to battery pack via the at least one charging mating-contact element; wherein the control unit is designed to sense and evaluate a time characteristic of a measurement voltage applied to the at least one charging mating-contact element.

Compared to the prior art with a simple coding element, the hand-held power tool according to the disclosure and the charger according to the disclosure are able to read out at least one additional item of information, and even correspondingly more information if the battery pack is accordingly embodied as per the above descriptions to generate a plurality of distinguishable time courses.

It may be provided in this case that, on the hand-held power tool side or on the charger side, there is a pull-up resistor electrically connected to the at least one signal mating contact element, or to the at least one charging mating-contact element.

Further features, possible applications and advantages of the disclosure will be apparent from the following description of the exemplary embodiments of the disclosure, which are represented in the figures. It is to be noted in this regard that the features represented are merely descriptive and may also be used in combination with features of other further developments described above, and are not intended to limit the disclosure in any manner.

BRIEF DESCRIPTION OF THE DRAWINGS

The disclosure is described in more detail in the following with reference to the appended figures, with the same references being used for features that are the same. The drawings are schematic and show:

FIGS. 4a-c schematic representations of an electrical contact between a signal contact element on the battery-pack side and a mating signal contact element on the machine side, according to an embodiment of the present disclosure, at different points in time; and FIGS. 5a-c schematic representations of an electrical contact between a signal contact element on the battery-pack side and a mating signal contact element on the machine side, according to an embodiment of the present disclosure, at different points in time.

DETAILED DESCRIPTION

Figure 1:
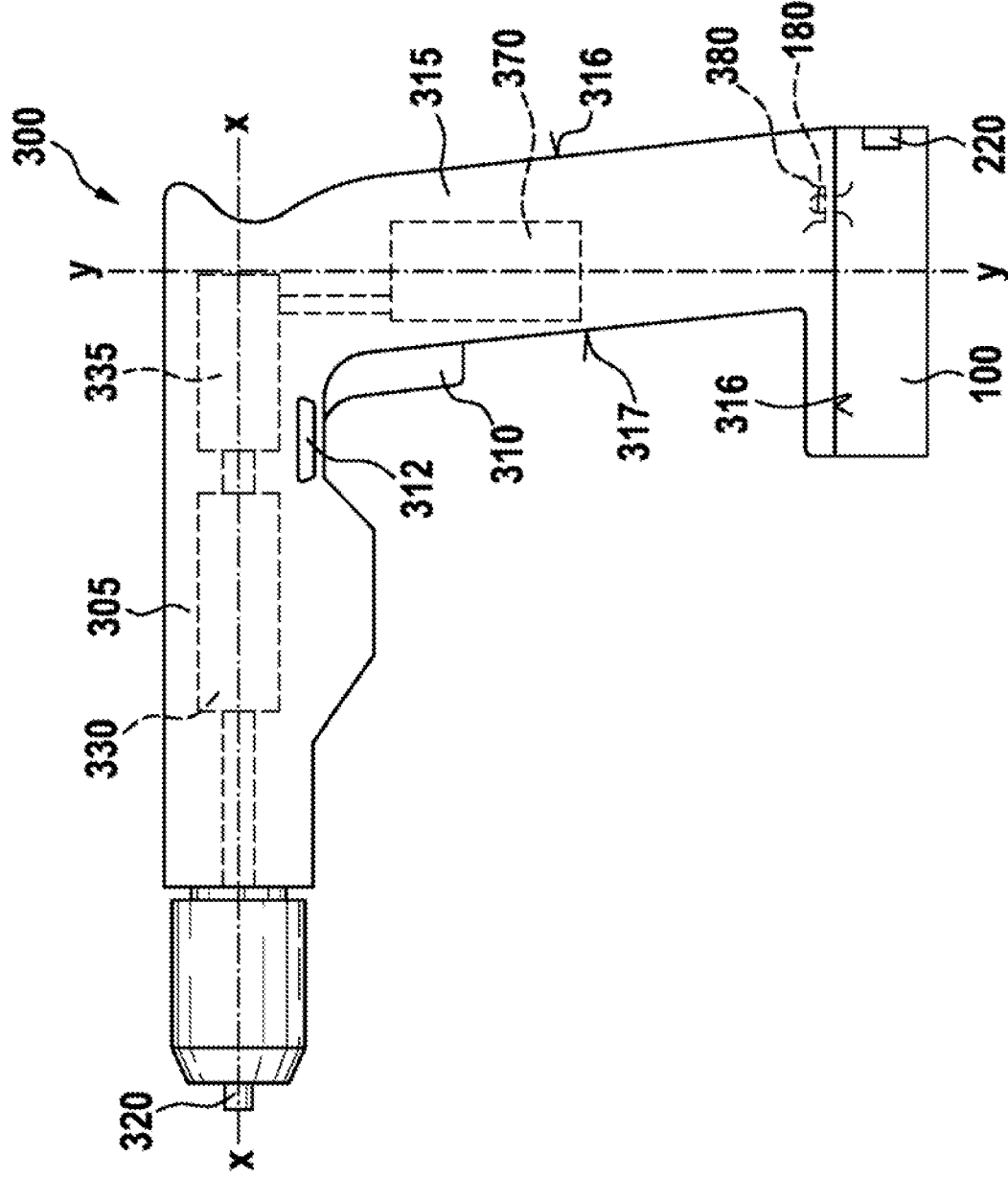
FIG. 1 exemplarily, a view of a hand-held power tool with a battery pack according to the disclosure.

FIG. 1 shows an electric appliance realized as a hand-held power tool 300, which is exemplarily realized as a cordless drill/driver. Accordingly, in the represented embodiment, the hand-held power tool 300 is mechanically and electrically connected to a battery pack 100 for mains-independent power supply. It is noted, however, that the present disclosure is not limited to cordless drill/drivers, but rather can be applied to various hand-held power tools 300. The hand-held power tool 300 has a transmission 330, located in a housing 305, for transmitting a torque, generated by a drive motor 335, to a drive shaft rotating about an axis x, attached to which there is a tool receiver 320 for a tool, not represented, and a handle 315. Located within the housing 305 there are electronics 370 that are in electronic and/or mechanical contact with the drive motor 335 and/or the transmission 330. The handle 315 serves as a support surface for a hand of an operator of the hand-held power tool 300 and generally has a longitudinal axis y, a front side 317 facing along an axis x in the direction of the tool receiver 320, a rear side 316, and two lateral surfaces 318.

Located in the region of the handle 315 there is a first operating element 310 for the power supply of the drive motor 335, the first operating element 310 protruding from the housing 305 in a manner that is manually accessible to the user, such that, in a manner known per se, open-loop and/or closed-loop control of the drive motor can be made possible by a pressure movement of the first operating element 310, preferably in dependence on the adjustment travel of the first operating element 310, and also the power supply for the drive motor 335 can be switched on and/or off. Furthermore, the hand-held power tool 300 has a second operating element 312 in the form of a slide switch for setting the direction of rotation of the drive motor 335 of the hand-held power tool 300. The second operating element 312 is located such that it can be shifted perpendicularly to the axis of rotation x of the drive shaft, in particular of the tool receiver 320 of the hand-held power tool 300, such that the second operating element 312 can be moved back and forth between a first position, a second position and a third position when actuated. The first and the second position in this case each define a direction of rotation of the drive motor. Thus, the user of the hand-held power tool 300 can already see, from the positions of the second operating element 312, in which working mode the hand-held power tool 300 is working. In addition, the second switching element has a third position, for example a middle position, between the first position and the second position, an electrical, electromechanical and/or mechanical interruption of the motor current being effected in the third position. Thus, for example, the operation of the first operating element 310 may be mechanically locked, the second operating element 312 having a locking effect on the first operating element 310 when moved to a third position. The second operating element 312 may be embodied as a slide switch, as represented, or alternatively as a toggle switch.

The first operating element 310 and the second operating element 312 are located along the axis of rotation x in such a manner that it is possible to actuate both the first and the second operating element 310, 312 with the index finger or middle finger. The distance between the first operating element 310 and the second operating element 312 is selected in such a way that one-handed operation of the hand-held power tool 300 is possible. Furthermore, both operating elements 310, 312 are located in a region beneath the axis of rotation x and protrude from the housing 305.

In the position shown in FIG. 1, the battery pack 100 is attached to the handle 315 of the hand-held power tool 300 and locked by locking means. As a result of the battery pack 100 being located beneath the handle 315, there is no interference with the operation of the hand-held power tool 300. The locking means, not represented in detail, comprise, inter alia, a locking element and an actuating element 220. The battery pack 100 can be detached from the handle 315 of the hand-held power tool 300 by actuation of the actuating means 220. Furthermore, the hand-held power tool 300 has an interface 380.

The battery pack 100 represented in FIG. 1 is embodied as a sliding battery pack and has an interface 180 corresponding to the interface 380 of the hand-held power tool 300. As an alternative to the sliding battery pack, an embodiment as a rotating or swiveling battery pack is also possible, in which case the battery pack 100 can be detachably locked to the housing 305 of the hand-held power tool 300 on the side opposite the swiveling axis by latching, screw-fastening, clamping or tensioning. In this way, a possible falling away of the battery pack from the housing 305 can be effectively counteracted.

For the purpose of detachably attaching the battery pack 100 to a hand-held power tool 300 or to a charger, the battery pack 100 has an interface 180 for detachable mechanical and electrical connection to a corresponding interface 380 of the hand-held power tool 300 or a corresponding interface of the charger. In the attaching of the battery pack 100, receiving means, e.g. guide grooves and guide ribs, of the hand-held power tool 300 or of the charger for receiving the corresponding guide elements of the battery pack 100 are brought into engagement with these guide elements, the battery pack 100 being inserted along the receiving means and the interface 180 of the battery pack 100 being slid into the corresponding interface 380 of the hand-held power tool 300 or the corresponding interface of the charger. The battery pack 100 can be assigned to the hand-held power tool 300 and/or to the charger on the basis of the mechanical design of the interfaces 180, 380.

For simplicity, the following explanations relating to FIGS. 2 to 5 will refer to a hand-held power tool 300 as an appliance connected to the battery pack, and it will not be mentioned each time that the appliance connected to the battery pack 100 may also be a charger 700. However, the explanations relating to FIGS. 3 to 5 apply analogously to an arrangement of the battery pack 100 on a charger 700.

To lock the battery pack 100 to the handle 315 of the hand-held power tool 300, the battery pack 100 is slid along the handle 315, along a lower outer surface of the handle 315 oriented substantially perpendicularly to the longitudinal direction y of the handle 315. In the position shown in FIG. 1, the battery pack 100 is locked to the handle 315 by locking means. The locking means comprise, inter alia, a locking element 210 represented in FIG. 2 and an actuating means. The battery pack 100 can be detached from the handle 315 of the hand-held power tool 300 by actuation of the actuating means. After the battery pack 100 has been unlocked it can be separated from the handle 315. In the attaching of the battery pack 100 to a hand-held power tool 300, the locking element 210 is brought into engagement with a corresponding receiver in the handle 315 of the hand-held power tool 300, which is not shown in detail.

Figure 2:
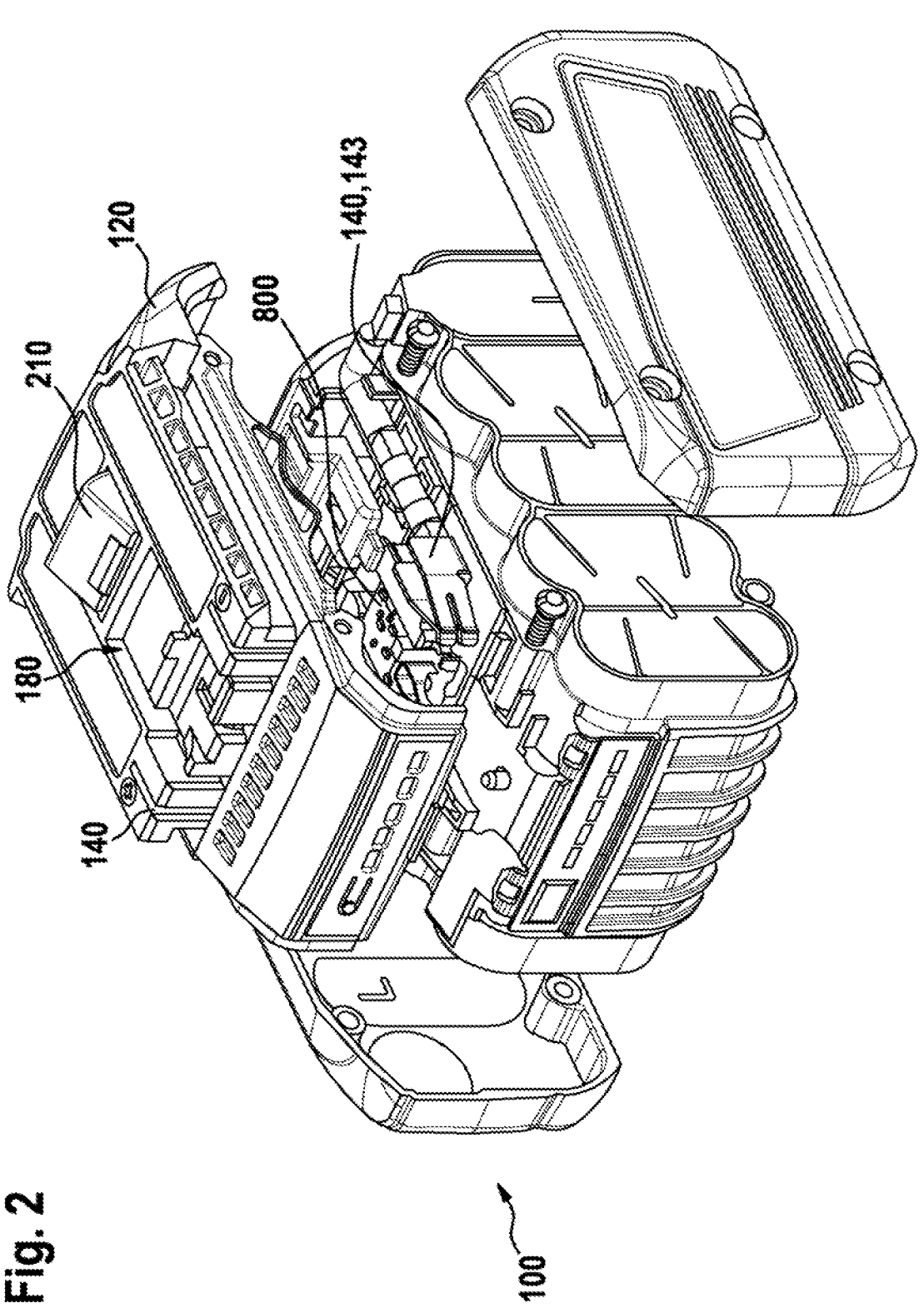
FIG. 2 a perspective exploded representation of an embodiment of a battery pack according to the disclosure.

As can be seen in the exploded view of FIG. 2, the interface 180 also comprises contact elements 140 for electrically contacting the battery pack 100 to the hand-held power tool 300 or the charger. The contact elements 140 comprise both voltage contact elements, which serve as charging and/or discharging contact elements, and signal contact elements, which enable signal transmission from the battery pack 100 to the hand-held power tool 300 and/or from the hand-held power tool 300 to the battery pack 100, with "signal transmission" to be understood here as transmission of information, which in the simplest case is 1-bit items of information such as "0" or "1", but may also be, for example, a value of a voltage or of a resistance.

As described at the outset, certain signal contact elements on the battery-pack side are connected to coding elements, for example coding resistors, which encode information for the hand-held power tool 300 or the charger, for example the maximum charging and discharging current, the present operating temperature and the internal resistance of the battery pack. Typically, located in the corresponding mating contact elements of the hand-held power tool and/or the of charger, there is a pull-up resistor, via which the coding resistor on the battery-pack side is supplied with voltage.

Figure 3:
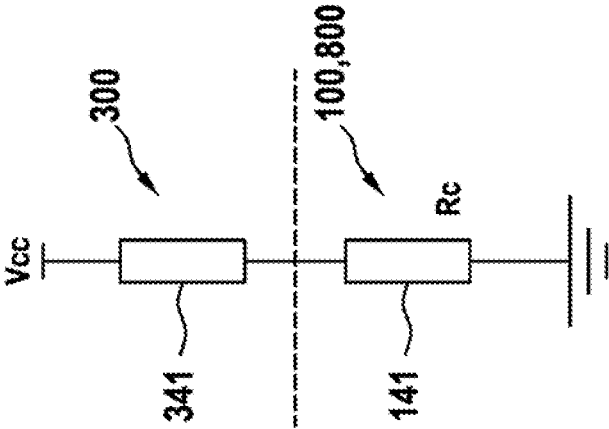
FIG. 3 a schematic representation of an electrical contact between a signal contact element on the battery-pack side and a mating signal contact element on the machine side, according to the prior art.

A simplified circuit diagram of such a known arrangement is shown in FIG. 3. Here, as also in FIGS. 4 and 5, a dashed line represents the interface between a battery pack 100, or battery-pack electronics 800, and a hand-held power tool 300, or charger. In FIGS. 3 to 5, the connection between the electronics of the battery pack and the electronics of the hand-held power tool 300 is marked as a continuous line; the contact elements of the interfaces on the battery-pack side and machine side located between the devices are not represented. Also not represented are further details of battery-pack electronics designed to provided information relating to the battery pack 100 to the hand-held power tool 300 via the at least one signal contact element 143. This information relating to the battery pack 100 is stored, at least in part, in the at least one coding element 141, which will be described in yet more detail in the following.

In the example represented in FIG. 3, the coding element 141 is a resistor having the resistance value Rc. Shown on the hand-held power tool 300 side there is a pull-up resistor, via which power is supplied to the coding element 141. In the embodiment represented, a supply voltage Vcc is applied to the pull-up resistor 341 and the coding element 141. Following application of the supply voltage Vcc, a measuring circuit in the hand-held power tool, or in the charger, ascertains the resistance connected to the signal contact element, which is interpreted by a corresponding control system of the hand-held power tool, or charger, as information specific to the battery pack.

As described at the outset, this type of information transfer is limited, in the embodiment shown, to a resistance value.

In order to remedy this disadvantage and at the same time ensure full compatibility and functionality with appliances of the prior art, it is specified according to the disclosure, on the one hand, to apply a measuring voltage to the at least one coding element 141 via the battery-pack electronics 800. As shown in FIG. 4b, according to the disclosure the coding element 141 is also interconnected in the battery-pack electronics 800 in an electrical parallel circuit in parallel with a dynamic current path, which is now described with reference to the embodiment of the disclosure shown in FIG. 4. In FIGS. 4 and 5, features already described in FIG. 3 have the same references as in FIG. 3.

In the embodiment of FIG. 4, the dynamic current path comprises at least a first resistor 241 having a resistance value Rx and a first capacitor 243 having a capacitance Cx, connected in series. Depending on the embodiment of the disclosure, the first resistor 241 is located in front of the first capacitor 243 (R-C series connection) or behind the first capacitor (C-R series connection) as viewed from the interface, this making no difference in respect of the technical effect desired here.

In the battery-pack electronics 800, the signal contact element 143 and the dynamic current path are thus connected in an electrical parallel circuit between a common ground terminal and the signal contact element 143, this being indicated by the corresponding ground symbol in the figure.

If a voltage Vcc is now applied to the circuit shown in FIG. 4b, then with the first capacitor 243 initially fully discharged, the electrical situation shown in FIG. 4a is established in which the voltage is divided, according to the voltage divider consisting of the pull-up resistor 341 and the parallel circuit of Rc and Rx, across the dynamic current path and the static path that contains the non-time-varying coding element 141. This is particularly advantageous as it can thereby be ensured that a switching threshold that may be necessary for digital communication between the battery pack 100 and the hand-held power tool 300 is exceeded without significant additional time delay.

Persons skilled in the art will recognize that when the measuring voltage Vc is applied, the capacitor 234 charges up to its final value with the time constant $\tau=Rx*Cx$ in dependence on its capacitance Cx and the resistance Rx of the coding element 141. When this final value is attained, no more current flows through the dynamic current path and the steady-state voltage value corresponds to the voltage divider consisting of the pull-up resistance 341 and the coding element 141, this being represented schematically in FIG. 4c. Electrically, the steady-state system is thus exactly as if the dynamic current path did not exist.

In embodiments of the disclosure, the time constant $\tau=Rx*Cx$ is such that at the time point of the steady-state measurement of the coding element 141, the first capacitor 243 is already sufficiently charged and thus the deviation from the steady-state system known from the prior art and shown in FIG. 3 is negligible. Preferably, the capacitance Cx of the at least one first capacitor 243 and the resistance value Rx of the at least one first resistor 241 are selected in such a manner that the time constant $\tau=Rx*Cx$ of the first dynamic current path has a value of $\tau<10$ ms, preferably $\tau<1$ ms.

In this embodiment, the dynamic current path is thus configured to influence the time characteristic of the measuring voltage Vc only within a defined period of time after the battery pack 100 has been connected to the corresponding hand-held power tool 100 or to the corresponding charger 700. This influencing of the time characteristic of the measuring voltage Vc can be sensed and evaluated by a correspondingly realized control unit of a hand-held power tool 300 or of a charger.

Figure 6:
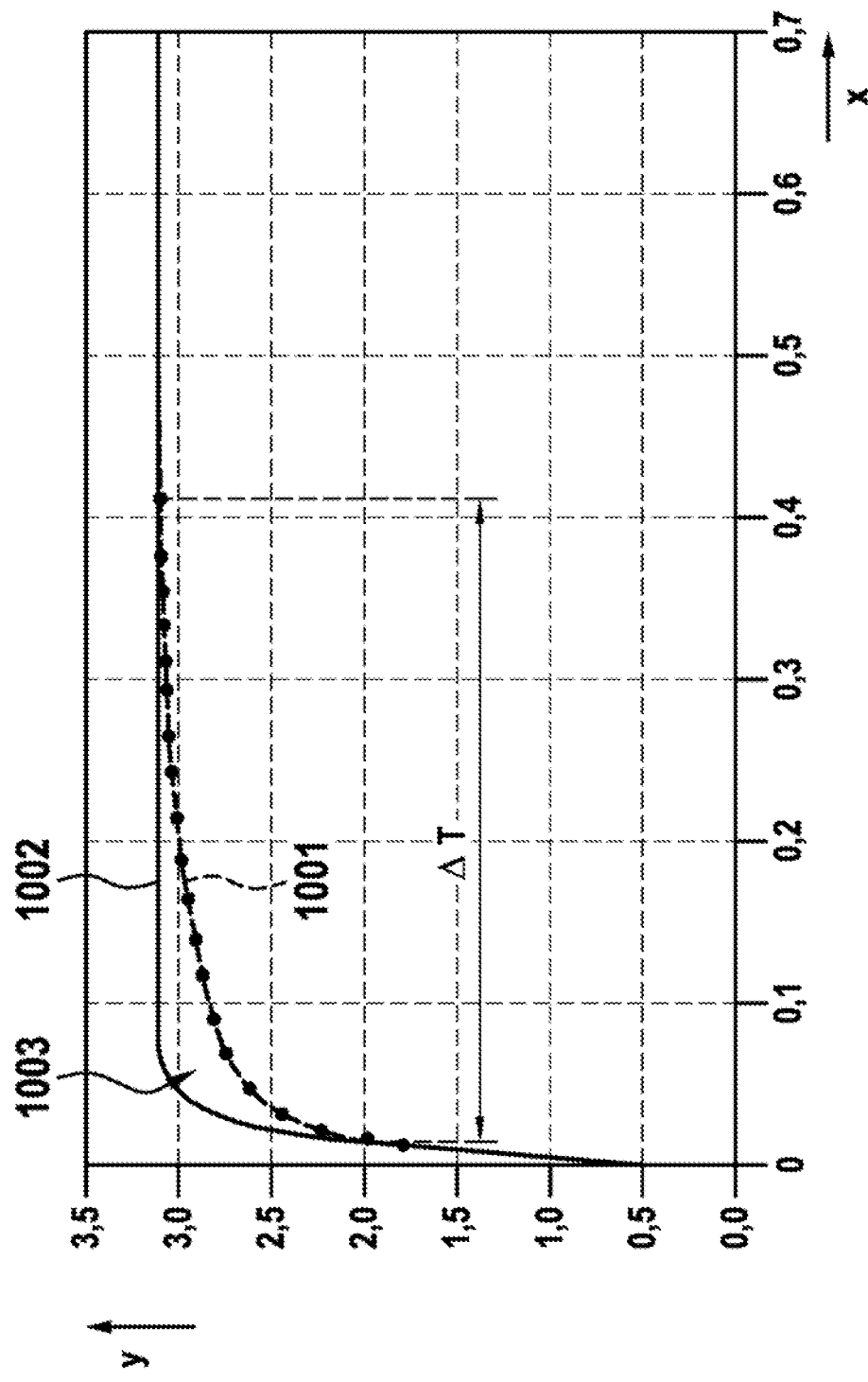
FIG. 6 a representation of a measured voltage characteristic at a signal contact element according to an embodiment of the present disclosure.

To illustrate this circumstance, FIG. 6 shows an example of a time characteristic of a voltage Vc applied to the coding element 141 following application of the supply voltage Vcc as explained in connection with FIG. 4. The time is plotted on the horizontal x-axis, and a normalized voltage at the coding element 141 is plotted on the y-axis perpendicular to it.

The time characteristic, which is marked with a dotted curve 1001, is based on an example configuration of the circuit shown in FIG. 4b, comprising pull-up resistor 341, coding element 141, as well as first resistor 241 and first capacitor 243 in R-C circuit. The continuous curve 1002, which is not marked further, corresponds to the circuit, embodied according to the prior art, without a dynamic current path, with the otherwise unchanged components pull-up resistor 341 and coding element 141.

Persons skilled in the art will notice the slight difference in the rising edge of the time characteristics 1001, 1002 immediately following application of the supply voltage Vcc, as well as in the steady state, in which the two time characteristics 1001, 1002 approach each other again. The measurable voltage characteristic in a time window $\Delta T$ between them is characterized by a deviation of the two time characteristics 1001, 1002 in a region 1003, which is influenced by the electrical properties of the dynamic current path and allows inferences to be made about the capacitance Cx and/or the resistance value Rx. The presence of the described time response may be monitored, for example, via a microcontroller of the hand-held power tool 300 or of the charger by measuring the voltage at the coding element 141 during the charging process of the circuit. This can be used to code any 1-bit information. For increased depth of information, the characteristics of the described time response may also be evaluated.

To protect the battery-pack electronics 800 from electrostatic discharge, in the prior art a protective capacitor 145 or a protective diode can be connected in an electrical parallel circuit in parallel with the at least one coding element 141, which is represented in FIG. 5b. FIG. 5b also shows the further development of this circuit according to the disclosure with a dynamic current path which, as represented in FIG. 4b, comprises the first resistor 241 having a resistance value Rx and the first capacitor 243 having capacitance Cx, in series connection.

When a voltage Vcc is applied to the circuit shown in FIG. 5b, with the first capacitor 243 initially fully discharged and the protective capacitor 145 fully discharged, the electrical situation shown in FIG. 5a is established, in which the protective capacitor 145 allows a short circuit to ground and begins to charge due to the current flow.

This charging process results in the current flow at the first capacitor 241 being equal to zero immediately following the application of the supply voltage Vcc, and in the first capacitor 241 starting to charge only as the charge of the protective capacitor 145 increases. When the protective capacitor 145 and the first capacitor 241 are fully charged, the electrical system shown in FIG. 5c is established, which is identical to that of FIG. 4c.

In a preferred embodiment, the dynamic current path is characterized by a capacitance value Cx and/or resistance value Rx typical of the battery pack which, when a supply voltage from a hand-held machine tool or a charger is applied to the signal contact element, generates a time response in the measurement voltage across the coding element that is typical of this battery pack, and this time response can be distinguishable from the time response of other battery packs or battery pack types that are characterized, for example, by dynamic current paths with different capacitance values Cx and/or resistance values Rx, or that do not contain any dynamic current paths.

In a further embodiment, the battery-pack electronics 800 comprise two or more dynamic current paths, wherein each of the plurality of dynamic current paths are interconnected in an electrical parallel circuit in parallel with the at least one coding element 141, and wherein each of the plurality of dynamic current paths has at least one first resistor 241 having a resistance value Rx, i and at least one capacitor 243 having a capacitance Cx, i, connected in series. As in the embodiment discussed above, basically any number of bits can be coded in this way.

In general terms, in one embodiment it is provided that the battery-pack electronics 800 comprise two or more dynamic current paths, wherein each of the plurality of dynamic current paths is interconnected in an electrical parallel circuit in parallel with the at least one coding element 141, and wherein each of the plurality of dynamic current paths is constructed, in respect of its electrical components and its interconnection, in a manner similar to the first dynamic current path.

Although the disclosure has been explained in more detail by the preferred exemplary embodiments, other combinations of the said features may be provided by persons skilled in the art, without departure from the scope of protection of the disclosure.

The invention claimed is:

1. A battery pack for a hand-held power tool, comprising:
at least one interface configured to establish an electrical connection of the battery pack to a hand-held power tool and/or a charger, wherein the at least one interface has a plurality of contact elements configured to electrically contact corresponding mating contact elements on the hand-held power tool and/or corresponding mating contact elements on the charger, and wherein at least one contact element of the plurality of contact elements is a signal contact element that is electrically connected to at least one coding element of the battery pack; and
battery-pack electronics configured to provide information relating to the battery pack via the at least one signal contact element,
wherein the information relating to the battery pack is stored, at least in part, in the at least one coding element, wherein in the battery-pack electronics, the at least one coding element is connected, in an electrical parallel circuit, in parallel with two or more dynamic current paths,
wherein each of the two or more dynamic current paths is interconnected in the electrical parallel circuit in parallel with the at least one coding element, and
wherein each of the two or more dynamic current paths is constructed, in respect of its electrical components and its interconnection, in a similar manner.

2. The battery pack according to claim 1, wherein:
the battery-pack electronics are configured to forward a supply voltage to the at least one coding element via a series resistor in a hand-held power tool or in a charger; and
the two or more dynamic current paths are configured to influence a time characteristic of a measurement voltage across the at least one coding element.

3. The battery pack according to claim 2, wherein:
the two or more dynamic current paths are configured to influence the time characteristic of the measurement voltage across the at least one coding element only within a defined period of time after the supply voltage from the corresponding hand-held power tool and/or the corresponding charger is applied; and
the defined period of time is between 0 ms and 10 ms.

4. The battery pack according to claim 1, wherein, in the battery-pack electronics, the at least one signal contact element and the two or more dynamic current paths are connected in the electrical parallel circuit between a common ground terminal and the at least one signal contact element.

5. The battery pack according to claim 1, wherein the two or more dynamic current paths each comprise at least one first capacitor and at least one first resistor connected in series.

6. The battery pack according to claim 5, wherein a capacitance of the at least one first capacitor and a resistance value of the at least one first resistor are selected such that a time constant $\tau=Rx*Cx$ of the at least one first capacitor has a value of $\tau<10$ ms.

7. The battery pack according to claim 5, wherein:
the two or more dynamic current paths each have a defined capacitance value Cx and/or a defined resistance value Rx that, when a supply voltage from a hand-held power tool or charger is applied to the at least one signal contact element, generate/generates a defined time response in a measurement voltage across the coding element; and
the defined time response is distinguishable from the time response of other battery packs or battery pack types.

8. The battery pack according to claim 5, wherein:
each of the two or more dynamic current paths has at least a first resistor of resistance value Rx,i and at least one first capacitor of capacitance Cx,i connected in series; and
any combination of the two or more dynamic current paths within battery packs to be distinguished generates a distinguishable time response at the interface with the hand-held power tool and/or the charger.

9. The battery pack according to claim 1, wherein there is a protective capacitor or a protective diode connected in an electrical parallel circuit in parallel with the at least one coding element.

10. The battery pack according to claim 1, wherein the at least one coding element is a coding resistor.

11. The battery pack according to claim 1, wherein the at least one coding element is an ohmic resistor, and a coding value of the at least one coding element is an ohmic resistance value of the ohmic resistor.

12. A hand-held power tool, comprising:

a battery pack including (i) at least one interface configured to establish an electrical connection of the battery pack to a hand-held power tool and/or a charger, wherein the at least one interface has a plurality of contact elements configured to electrically contact corresponding mating contact elements on the hand-held power tool and/or corresponding mating contact elements on the charger, and wherein at least one contact element of the plurality of contact elements is a signal contact element that is electrically connected to at least one coding element of the battery pack, and (ii) battery-pack electronics configured to provide information relating to the battery pack via the at least one signal contact element, the information relating to the battery pack is stored, at least in part, in the at least one coding element, and in the battery-pack electronics, the at least one coding element is connected, in an electrical parallel circuit, in parallel with two or more dynamic current paths;

an interface configured to electrically couple the battery pack to the hand-held power tool, comprising at least one signal mating-contact element corresponding to the at least one signal contact element of the battery pack; and a control unit configured to (i) receive information relating to the battery pack via the at least one signal mating-contact element, and (ii) sense and evaluate a time characteristic of a measurement voltage applied to the at least one signal mating-contact element, wherein each of the two or more dynamic current paths is interconnected in the electrical parallel circuit in parallel with the at least one coding element, and wherein each of the two or more dynamic current paths is constructed, in respect of its electrical components and its interconnection, in a similar manner.

13. The hand-held power tool as claimed in claim 12, further comprising a pull-up resistor electrically connected to the at least one signal mating-contact element.

14. The battery pack according to claim 3, wherein the defined period of time is between 0 ms and 1 ms.

15. The battery pack according to claim 6, wherein a capacitance of the at least one first capacitor and a resistance value of the at least one first resistor are selected such that the time constant $\tau=Rx*Cx$ of the first capacitor has a value of $\tau<1$ ms.

* * * * *